(12) United States Patent
Haller et al.

(10) Patent No.: US 11,501,036 B2
(45) Date of Patent: Nov. 15, 2022

(54) SIMULATIONS IN A MODEL OF A PROCESS CONTROL SYSTEM

(71) Applicant: ABB Schweiz AG, Baden (CH)

(72) Inventors: Axel Haller, Gorxheimertal (DE); Chaojun Xu, Weinheim (DE); Mario Hoernicke, Landau (DE); Rainer Drath, Mannheim (DE)

(73) Assignee: ABB Schweiz AG, Baden (CH)

( * ) Notice: Subject to any disclaimer, the term of this patent is extended or adjusted under 35 U.S.C. 154(b) by 841 days.

(21) Appl. No.: 16/359,312

(22) Filed: Mar. 20, 2019

(65) Prior Publication Data

US 2019/0303516 A1    Oct. 3, 2019

(30) Foreign Application Priority Data

Mar. 28, 2018  (EP) .................................... 18164613

(51) Int. Cl.
*G06F 30/20*    (2020.01)
*G05B 17/02*    (2006.01)
(Continued)

(52) U.S. Cl.
CPC .............. *G06F 30/20* (2020.01); *G05B 17/02* (2013.01); *G05B 19/418* (2013.01);
(Continued)

(58) Field of Classification Search
CPC ..... G06F 30/20; G06F 2111/20; G05B 17/02; G05B 23/0251; G05B 19/418; G05B 19/41885; G05B 2219/32345
See application file for complete search history.

(56) References Cited

U.S. PATENT DOCUMENTS

| 8,135,481 B2 * | 3/2012 | Blevins .............. G05B 23/0267 |
| | | 702/179 |
| 11,216,159 B2 * | 1/2022 | Naidoo .................. G05B 15/02 |

(Continued)

OTHER PUBLICATIONS

Arroyo et al. "Automatic derivation of qualitative plant simulation models from legacy piping and instrumentation diagrams". Computers and Chemical Engineering 92 (2016) pp. 112-132 (Year: 2016).*

(Continued)

*Primary Examiner* — Eunhee Kim
(74) *Attorney, Agent, or Firm* — Whitmyer IP Group LLC

(57) ABSTRACT

A system model creating and simulation device for a process control system obtains description files of process modules including inputs, outputs and process control devices therebetween, where each description file specifies, for the corresponding module, connection terminals in the form of inputs and outputs, the process control devices and the interconnection of process control devices between the connection terminals, analyses of the description files, having determining a connection terminal of a first process module matching a connection terminal of a second process module, determines connections between the process modules based on the analysis, having determining a connection between the matching connection terminals, selecting simulation objects corresponding to the process control devices of the process modules, interconnecting the simulation objects according to data in the description files as well as through the connections determined between the process modules for forming a simulation model, and performing simulations in the simulation model.

20 Claims, 9 Drawing Sheets

(51) Int. Cl.
  *G05B 23/02* (2006.01)
  *G05B 19/418* (2006.01)
  *G06F 111/20* (2020.01)

(52) U.S. Cl.
  CPC ... *G05B 19/41885* (2013.01); *G05B 23/0251* (2013.01); *G05B 2219/32345* (2013.01); *G06F 2111/20* (2020.01)

(56) References Cited

U.S. PATENT DOCUMENTS

| | | | | |
|---|---|---|---|---|
| 2012/0029661 | A1* | 2/2012 | Jones | G06F 3/0484 700/17 |
| 2014/0172402 | A1 | 6/2014 | Rathgeb et al. | |
| 2016/0171130 | A1* | 6/2016 | Boys | G05B 17/02 703/6 |

OTHER PUBLICATIONS

Schenk Tim et al: "Architecture for modeling and simulation of technical systems along their lifecycle", Computing and Visualization in Science, Springer, Berlin, DE, vol. 17, No. 4, Jan. 27, 2016, XP035890428 pp. 167-183.

Veronika Brandstetter et al: "Early Validation of Automation Plant Control Software using Simulation Based on Assumption Modeling and Validation Use Cases", Complex Systems Informatics and Modeling Quarterly, No. 4, Oct. 30, 2015, XP055492577 pp. 50-65.

European Search Report Application No. EP 18 16 4613 Completed: Sep. 14, 2018; dated Sep. 24, 2018 10 pages.

Hossam A Gabbar Ed-Anonymous: "Intelligent Topology Analyzer for Improved Plant Operation", SICE-ICCAS 2006 International Joint Conference, IEEE, Piscataway, NJ, USA, Oct. 1, 2006, XP031050360 pp. 5737-5742.

\* cited by examiner

SIMULATIONS IN A MODEL OF A PROCESS CONTROL SYSTEM

TECHNICAL FIELD

The invention relates to a method and computer program product for obtaining a model of a process control system and performing simulations therein as well as to a system model creating and simulation device.

BACKGROUND

It is often of interest to perform simulations in a process control system and thereafter implement the process control system.

This in turn requires the creation of a simulation model of the process control system that can be used for simulation purposes.

The use of such a model is described in for instance US 2014/172402, which discloses a simulation system for a control system where interconnect execution containers with embedded software components having internal standardized interfaces are interconnected. There are also modules representing hardware components and an execution environment simulating the hardware of peripherals. A process simulator may also be connected to the simulation system. There is no information about how the elements of the execution container have been connected to each other.

US 2016/171130 is likewise concerned with a simulation system for a process control system. A simulation model that may be made up of simpler modules is used for the simulation, where each module has inputs, outputs, parameters, variables and associated mathematical equations simulating the behavior. The modules are interconnected through a user making selections in different drop-down menus. The document also describes that validity of connections may be checked.

D3: Schenk, Tim et al. "Architecture for modeling and simulation of technical systems along their lifecycle", Computing and Visualization in Science, Springer, Berlin vol. 17, no. 4, 27 Jan. 2016, pages 167-183, likewise describes a simulating system for a process control system. Here a model is formed using components selected by an engineer from a component library. There is also a simulator that builds an internal system simulation model by processing a system topology configuration and subsequent instantiating and parameterizing every component and connection of the topology from available model libraries.

The creation of a simulation model is thus typically a manual enterprise, where an operator may drag and drop simulation objects corresponding to process control devices into a system creation area and then interconnect the simulation objects for obtaining the simulation model.

However, it would be of interest to improve the way that the simulation model is created. It would above all be of interest to obtain the model and perform the simulations with less user interactions.

SUMMARY

One object of the invention is therefore to obtain a simulation model and perform simulations therein in a simpler and more efficient way.

This object is according to a first aspect of the invention achieved through a method for obtaining a model of a process control system and performing simulations therein, the method comprising:

obtaining description files of process modules used for visualizing a part of the process control system, each process module comprising one or more inputs, one or more outputs and one or more process control devices connected between the one or more inputs and outputs and each description file specifying, for the corresponding process module, connection terminals in the form of inputs and outputs, the process control devices and data specifying how the process control devices are connected between the inputs and outputs, analyzing the description files with regard to connection terminals, the analyzing comprising determining a first connection terminal of a first process module that matches a corresponding first connection terminal of a second process module, where the determining that the first connection terminals match comprises determining that one of the connection terminals is an input terminal and the other is an output terminal, determining connections between the process modules based on the analysis, the determining of connections comprises determining a connection between the first process module and the second process module including determining a connection between the first connection terminal of the first process module and the first connection terminal of the second process module, selecting simulation objects corresponding to the process control devices of the process modules for which connections have been determined, interconnecting the simulation objects according to the data specifying how the process control devices are interconnected between the inputs and outputs of the process modules as well as through the connections determined between the process modules for forming a simulation model of the process control system, and performing simulations in the simulation model.

The object is according to a second aspect of the invention achieved through a system model creating and simulation device for a process control system, the device being configured to:

obtain description files of process modules used for visualizing a part of the process control system, each process module comprising one or more inputs, one or more outputs and one or more process control devices connected between the one or more inputs and outputs and each description file specifying, for the corresponding module, connection terminals in the form of inputs and outputs, the process control devices and data specifying how the process control devices are connected between the inputs and outputs, analyze the description files with regard to connection terminals, the analyzing comprising determining a first connection terminal of a first process module that matches a corresponding first connection terminal of a second process module, where the determining that the first connection terminal matches the second connection terminal comprises determining that one of the connection terminals is an input terminal and the other is an output terminal, determine connections between the process modules based on the analysis, the determining of connections comprising determining a connection between the first process module and the second process module including determining a connection between the first connection terminal of the first process module and the first connection terminal of the second process module, select simulation objects corresponding to the process control devices of the process modules for which connections have been determined, interconnect the simulation objects according to the data specifying how the process control devices are interconnected between the inputs and outputs of the process modules as well as through the connections determined between the process modules for forming a simulation model of the process control system, and perform simulations in the simulation model of the process control system.

The object is according to a third aspect of the invention achieved through a computer program product for obtaining a model of a process control system and performing simulations therein, the computer program product comprising a data carrier with computer program code configured to cause a system model creating and simulation device to, when the computer program code is loaded into the system model creating and simulation device, obtain description files of process modules used for visualizing a part of the process control system, each process module comprising one or more inputs, one or more outputs and one or more process control devices connected between the one or more inputs and outputs and each description file specifying, for the corresponding process module, connection terminals in the form of inputs and outputs, the process control devices, and data specifying how the process control devices are connected between the inputs and outputs, analyze the description files with regard to connection terminals, the analyzing comprising determining a first connection terminal of a first process module that matches a corresponding first connection terminal of a second process module, where the determining that the first connection terminal matches the second connection terminal comprises determining that one of the connection terminals is an input terminal and the other is an output terminal, determine connections between the process modules based on the analysis, the determining of connections comprising determining a connection between the first process module and the second process module including determining a connection between the first connection terminal of the first process module and the first connection terminal of the second process module, select simulation objects corresponding to the process control devices of the process modules for which connections have been determined, interconnect the simulation objects according to the data specifying how the process control devices are interconnected between the inputs and outputs of the process modules as well as through the connections determined between the process modules for forming a simulation model of the process control system, and perform simulations in the simulation model of the process control system.

The invention has a number of advantages. It enables the provision of a simulation system using description files for process modules. Thereby, this data, which has been designed for the purpose of visualization, may be used for simplifying the obtaining of a simulation model. In this way simulations may be obtained more efficiently and faster with a limited additional effort. This also allows a reduction of costs, for instance through facilitating reduction of tests, such as FAT, SAT and startup services.

BRIEF DESCRIPTION OF THE DRAWINGS

The present invention will in the following be described with reference being made to the accompanying drawings, where FIG. 1 schematically shows a process control system to be designed, FIG. 2 schematically shows one realization of a system model creating and simulation device, FIG. 3 schematically shows another realization of a system model creating and simulation device, FIG. 4 schematically shows a first part of a description file for a process module, FIG. 5 schematically shows a second part of the description file for the process module.

DETAILED DESCRIPTION

In the following, a detailed description of preferred embodiments of a system model creating and simulating device as well as a method and a computer program product for obtaining a system model and performing simulations therein will be given.

Figure 1:
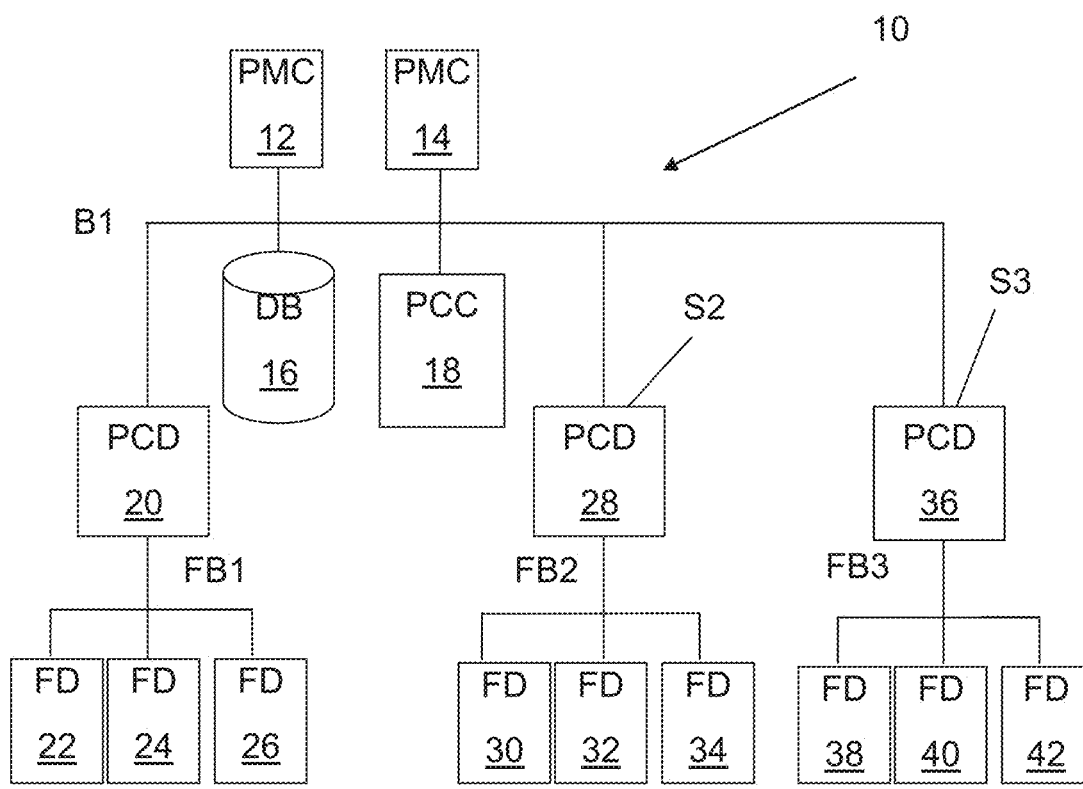

FIG. 1 schematically shows a process control system 10, which may be provided in the premises of an industrial plant. The process control system 10 is a computerized process control system for controlling an industrial process, such as a chemical process. A process may be monitored through one or more process monitoring computers, which communicate with a computer or server handling monitoring and control of the process.

In FIG. 1 the process control system 10 therefore includes a number of process monitoring computers (PMC) 12 and 14. These computers may here also be considered to form operator terminals and are connected to a first data bus B1.

There is also a process control computer PCC 18 and a database (DB) 16 connected to the first data bus B1. To this first data bus DB there is also connected a first, second and third controller 20, 28 and 36. A controller may be responsible for performing local control, such as control in a section of the control system 10 limited to field devices connected to a field bus. The process control computer 18 may in this case be responsible for overall control of the process, where the controllers 20, 28 and 36 are responsible for local control in the respective section. Each controller is thus connected to a corresponding group of field devices via a field bus FB.

The first controller 20 is connected to a first group of field devices 22, 24 and 26 via a first field bus FBl. The second controller 28 is connected to a second group of field devices 30, 32 and 34 via a second field bus FB2, and the third controller 36 is connected to a third group of field devices 30, 32 and 34 via a third field bus FB3. A field device is a physical interface to a process being controlled. A field device is therefore an interface, such as a sensor, via which measurements of the process are being made or an interface, such as an actuator, to which control commands are given for influencing the process. A field device may also be a combined sensor and actuator. A field device may as an example be a tank and another as an example a valve or transformer. The controllers 20, 28 and 38 may be involved in controlling the process in the corresponding section based on inputs from field devices, such as from sensors, and actuating the same or other field devices, such as valves based on the inputs. The process control computer 18 may in turn be involved in control of the different sections. Here it should also be mentioned that it is possible the control functionality performed by the controllers may in fact also be provided in the process control computer.

All the above-mentioned devices are examples of process control devices.

In the designing of the control functionality being performed in the control system in both the controllers and in the process control computer, one or more engineering terminals may be used. An engineering terminal may be a stand-alone computer that is used to generate computer program code that implements the process control functionality and this code will then implement the functionality when being implemented on a controller or the process control computer.

An engineering terminal may also be used for obtaining a visualization model of the process control system, i.e., a visual display of the process control system comprising interconnected visualized process control objects representing process control devices of the process control system. An engineering terminal may also be used for performing simulations in a simulation model of the process control system.

One engineering terminal may according to aspects of the invention be a system model creating and simulation device SMCSD 44.

Figure 2:
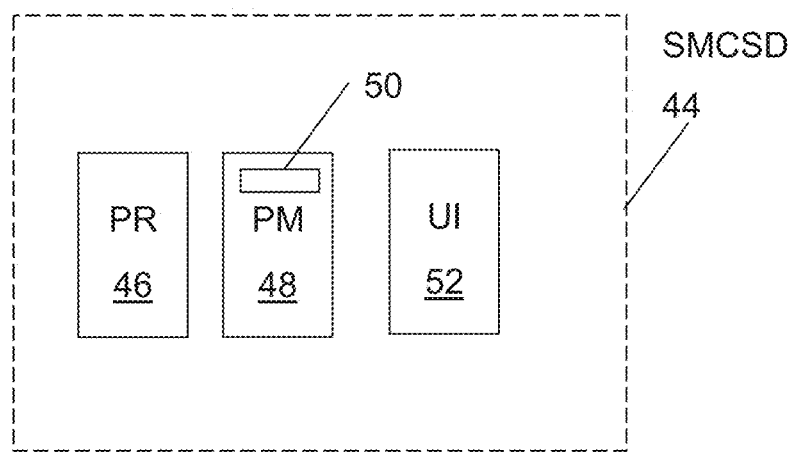

FIG. 2 shows one way of realizing a system model creating and simulation device 44. The system model creating and simulation device 44 may be realized as a computer comprising a processor (PR) 46 with program memory (PM) 48 comprising a computer program 50 with computer program code implementing the functionality of the system model creating and simulation device 44. The system model creating and simulation device 44 may also comprise a user interface (UI) 52 for instance in the form of a display and mouse/keyboard combination.

Figure 3:
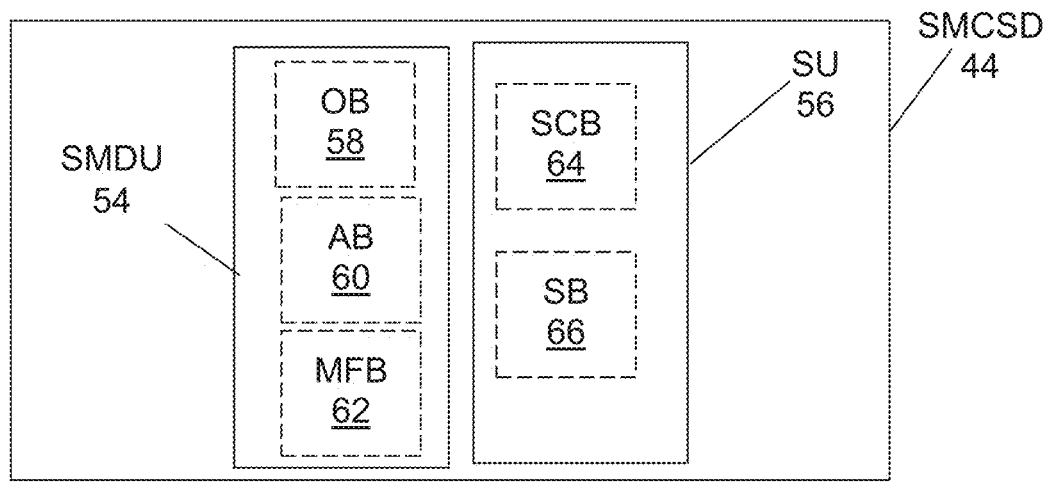

Another way of realizing the system model creating and simulation device 44 is shown in FIG. 3. The system model creating and simulation device 44 may comprise a system model defining unit (SMDU) 54 and a simulation unit (SU) 56, where the system model defining unit 54 comprises an obtaining block (OB) 58, an analyzing block (AB) 60 and a model defining block (MDB) 62, while the simulation unit 56 comprises a system construction block (SCB) 64 and a simulation block (SB) 66. It is here possible that these units 54 and 56 with their blocks are provided through software code in a computer program memory together with a processor for running this code. As an alternative the units may be provided in the form of one or more dedicated circuits such as such as Field-Programmable Gate Arrays (FPGAs) or Application Specific Integrated Circuits (ASICs).

The data base 16 may also comprise description files of process modules as well as simulation objects. Here a process module is a collection of a number of interconnected display objects forming a part of a visualized process control system, such as a number of graphical representations of process control devices being interconnected by graphical representations of interconnecting elements. Simulation objects in turn are objects representing process control devices, which when interconnected may be used for simulating activities in the process control system, such as simulating steady state operation, various fault cases, what-if scenarios etc. For this reason, a simulation object comprises computer program code for a simulating one or more functions of the process control device under various operating conditions.

There is a problem in that in order to be able to perform a simulation an operator will typically have to manually interconnect simulation objects that simulate the operation of the process control device in order to simulate the system.

This is both cumbersome and can also result in errors due to the required manual operator involvement.

There is therefore a need for simplifying the performing of simulations.

Sometimes there may exist building blocks that are used for visualizing the process control system. Such building blocks, here also called process modules, may include a limited number of process control device symbols representing a part of the process control system being designed as well as a number of display symbols representing connection elements that interconnect the process control devices. A model of the process may thus be designed for visualization through using a number of process modules, where a process module is thus typically a graphical representation of a section or part of a process control system that is to be constructed and comprising display symbols representing one or more process control devices, such as boilers, tanks, valves, heaters etc. as well as a number of display symbols representing connection elements that interconnect the process control devices within the process module. Such a process module may also have a number of connection terminals comprising at least one input and at least one output. Thereby a process module used for visualizing a part of the process control system comprises one or more inputs, one or more outputs and one or more process control devices connected between the one or more inputs and outputs of the module. A process control device is also connected to a connection terminal via a connection element. Moreover, such a connection element may be of different types. It may for instance be of a type carrying control signals, such as a control signal line. It may as an alternative be of a type carrying a physical quantity, such as a pipe carrying a liquid.

It is also possible that a process module is defined in a description file, for instance in a description file in the Extensible Markup Language (XML) format.

It would therefore be of interest to use such a process module and especially the description file associated with the process module in order to simplify the obtaining of a simulation model used for simulating the process control system.

As mentioned earlier, a description file in essence describes a number of inputs and outputs, a number of process control devices and the way that these process control devices are connected between these inputs and outputs. A description file therefore specifies, for a corresponding process module, connection terminals in the form of inputs and outputs, the process control devices and data specifying how the process control devices are connected between the inputs and outputs. It may also comprise data specifying type of connection element between the process control device and a connection terminal.

Figure 4:
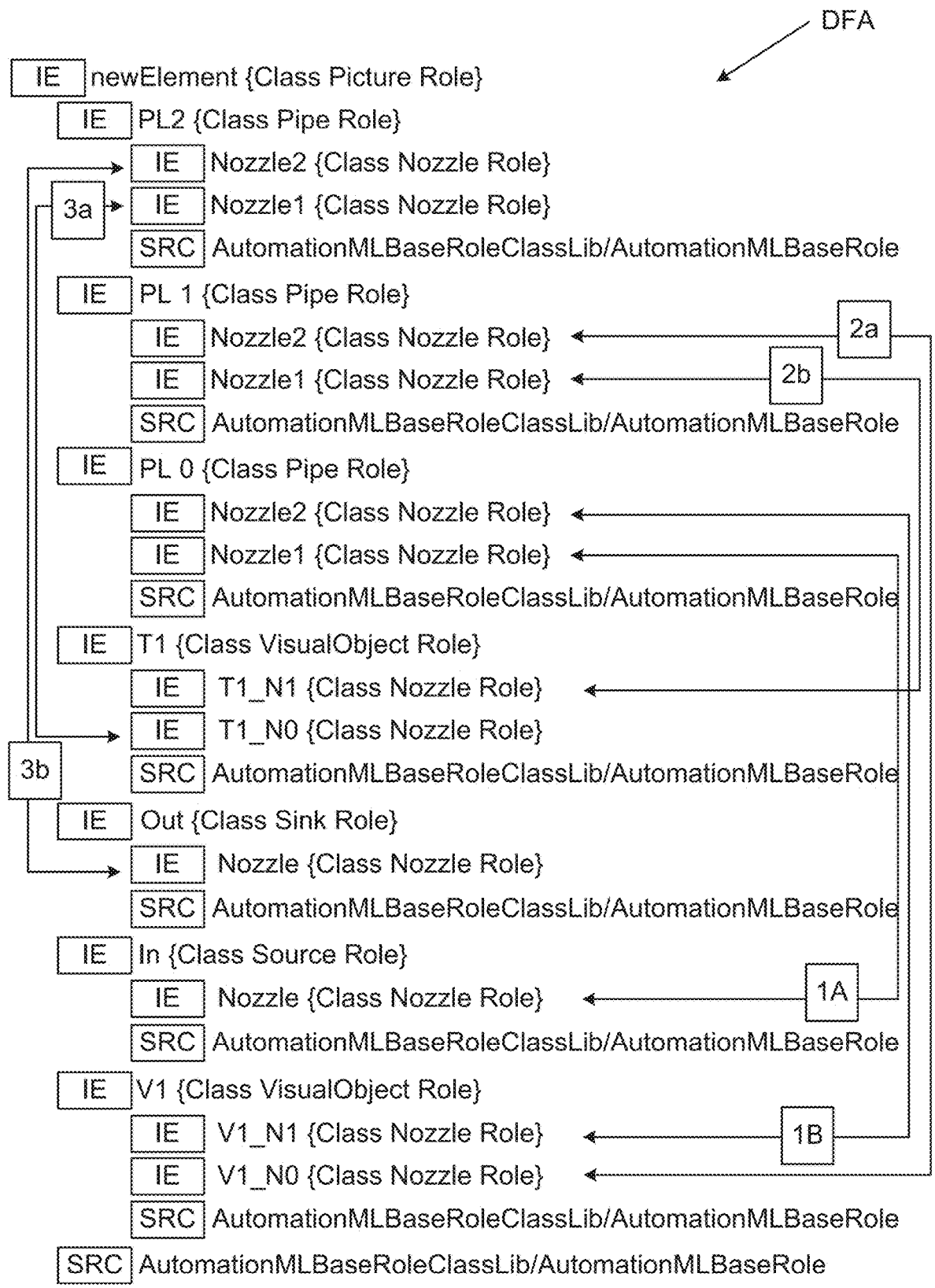
Figure 5:
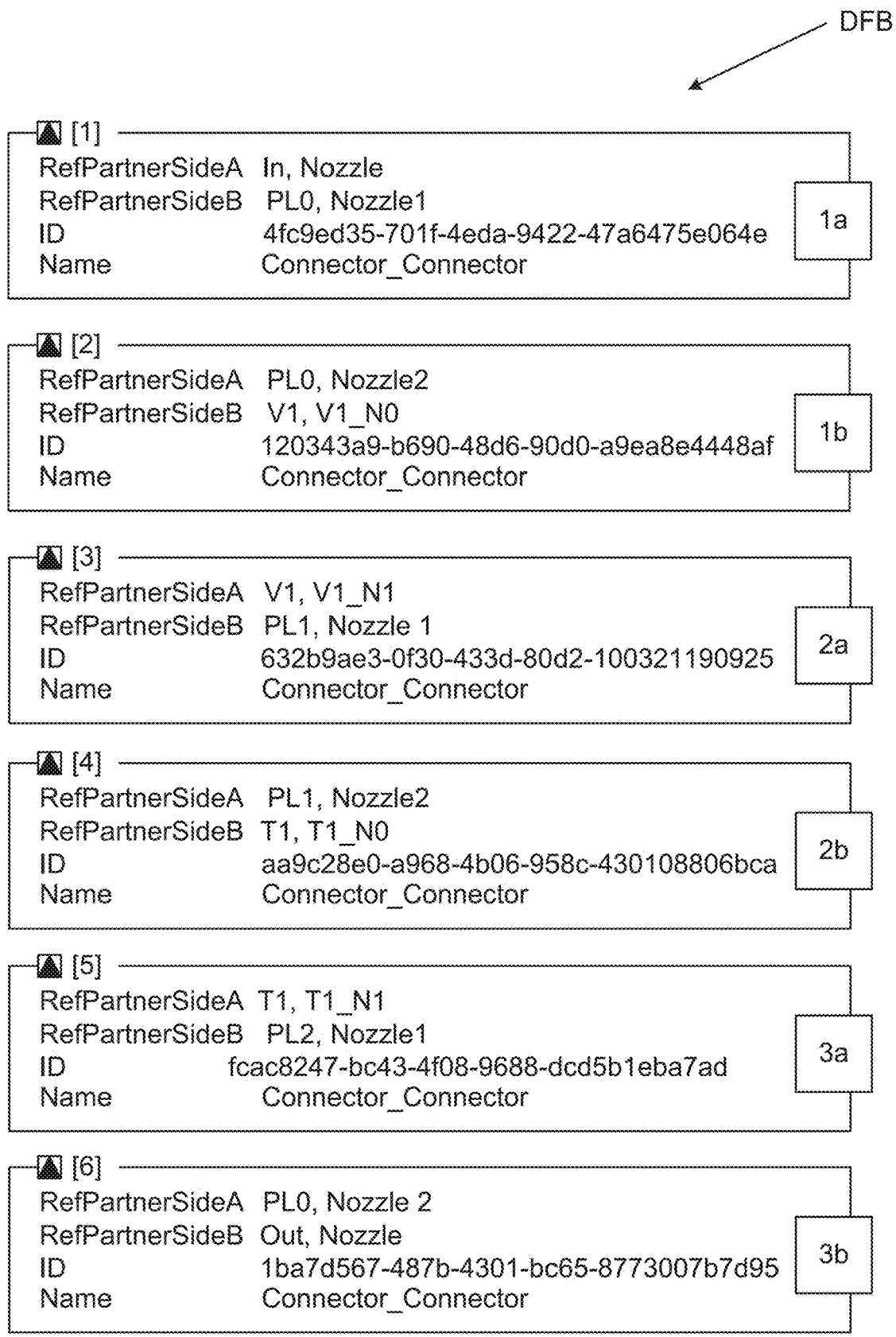

FIG. 4 schematically shows one example of a first part DFA of a description file defining an input and an output as well as the process control devices of the process module and elements used for connecting them between the input and output. FIG. 5 schematically shows another part DFB of the description file defining how the elements in the first part are interconnected and FIG. 4 in turn schematically shows the corresponding process module with process control devices with indications of the locations of different connection points.

Figure 6:
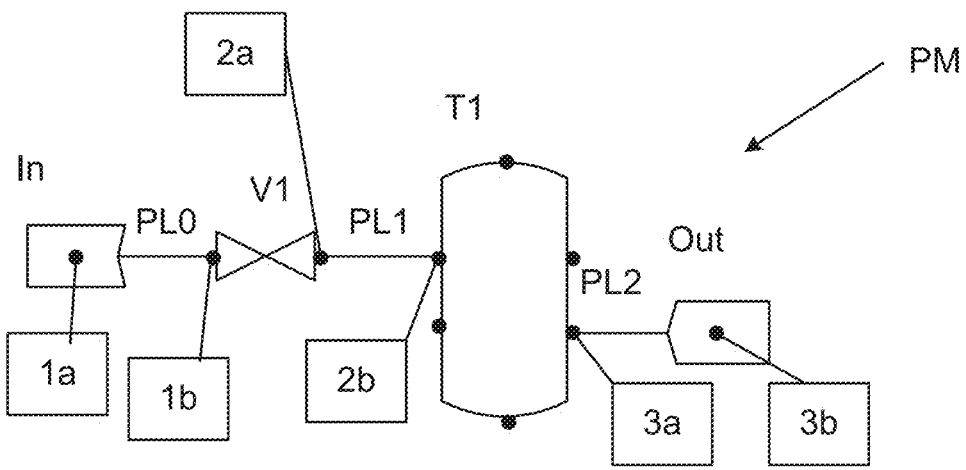
FIG. 6 shows an example of a process module realized through the description file in FIGS. 4 and 5.

As can best be seen in FIG. 6, the exemplifying process module PM comprises an input In and an output Out, and to the input In there is connected a valve V1 via a first pipe PL0, where the connection point between the first pipe PL0 and the input In is denoted 1a and the connection point between the first pipe PL0 and the valve V1 is denoted 1b. The valve V1 is also connected to a tank T1 via a second pipe PL1, where the connection point between the valve V1 and the second pipe PL1 is denoted 2a and the connection point between the second pipe PL1 and the tank T1 is denoted 2b. The tank T1 is finally connected to the output Out via a third pipe PL2, where the connection point between the tank T1 and the third pipe PL2 is denoted 3a and the connection point between the third pipe PL2 and the output Out is denoted 3b. These connections are thus internal connections in the process module.

It can be seen in FIG. 4 how the first part DFA of the description file defines the process control devices V1 and T1 as visual objects and the pipes PL0, PL1 and Pl2 as pipes, the input In as a source and the output Out as a sink. Moreover, the pipes, Input and Output are defined as having terminals, here defined as a first and second nozzle, for connection purposes. Also, the process control devices have defined connection terminals. The second part of the description file DFB then specifies how the connections are to be made, or rather which elements in the process module that are to be connected to each other at the various connection points. For connection point 1a it thus defines that the Nozzle of the Input is to be connected to Nozzle 1 of first pipe PL0, that Nozzle 2 of the first pipe PL0 is to be connected to input terminal V1_N0 of the valve V1 at connection point 1b, that connection terminal V1_N1 of the valve V1 is to be connected to Nozzle 1 of pipe PL1 at connection point 2a, that Nozzle 2 of pipe PL1 is to be connected to terminal T1_N0 of tank T1 at connection point 2b, that terminal T1_N1 of tank T1 is connected to Nozzle 1 of pipe PL2 at connection point 3a and that Nozzle 2 of pipe PL2 is to be connected to the Nozzle of the Output at connection point 3b. It can thereby be seen that there is a definition of how the process control devices are being connected to each other as well as the types of elements that are used for interconnecting them within the process module, such as a pipe having a nozzle as a connection terminal.

Thereby the two parts DFA and DFB of the description file together define the valve V1 and tank T1 as well as how they are connected between the input In and output Out using connecting elements in the form of pipes PL0, PL1 and PL2.

It can thus be seen that the description file describes a process module where as an example an input may be connected to a valve, which in turn may be connected to a tank, which is connected to an Output.

In addition to this information about how the process control devices are connected between the input and the output, the description file may also comprise information about parameters that are being used at various parts of the module, i.e., process control parameters. The description file may as an example comprise information about the types of parameters used by the process control devices. It is also possible that such process control parameters are associated with the connection terminals of the process module.

Moreover, it is also possible that a description file defines a number of interfaces for a process module where an interface may define a number of connection terminals passing through it, where a connection terminal may be an input or an output. A process module may thus comprise a number of interfaces each comprising a number of connection terminals. For such an interface it is also possible to define the type of parameters carried to or from a connections terminal. An interface may also be associated with or have a direction of connectivity, i.e., a direction set for the process module in which it is to be connected to another process module. A direction is in this case a direction away from the process module. The direction of connectivity may also be related to a process flow of parts of a process being handled by the process module as well as an orientation of the process control devices defined in the process module. As an example, the direction may be up, down, left, right, in front of and behind. One interface may thus be provided on a left side of the process module and another on the right side of the process module. Yet another interface may be on an upper side of the module and a further on a bottom side of the module. An interface may also be two- or three-dimensional.

Figure 7:
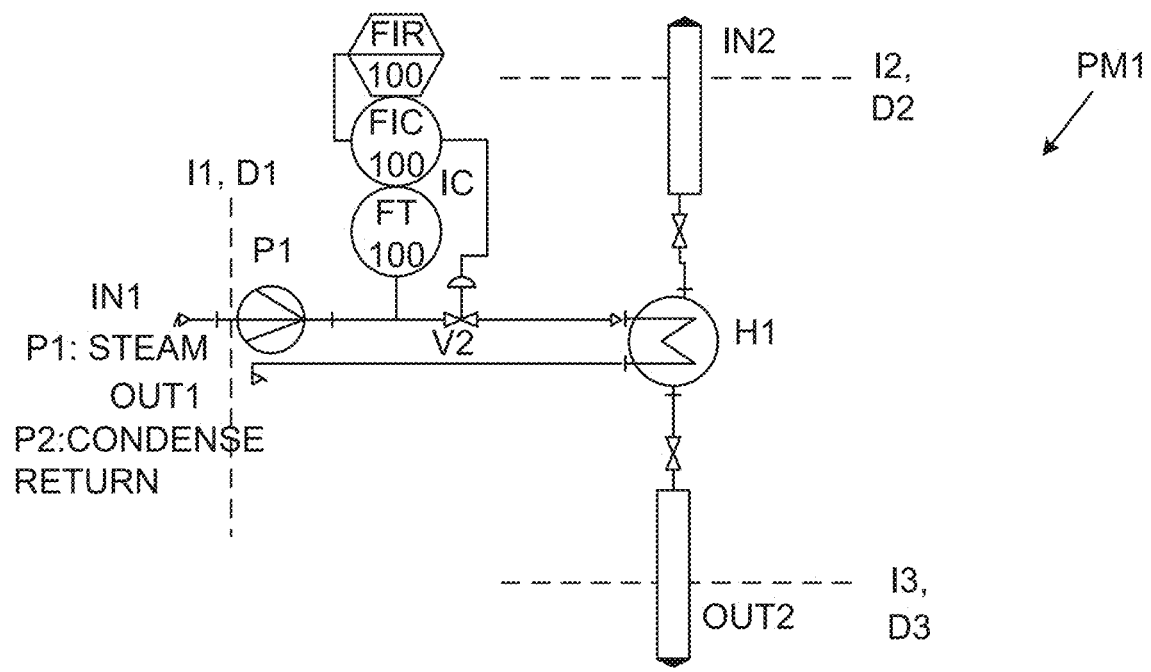
FIG. 7 shows another example of a process module having a number of interfaces with inputs and outputs.

FIG. 7 shows one such example of a first process module PM1 that is to be interconnected with a second process module. It can be seen that the first process module PM1 has a first, second and third interface I1, I2, and I3 indicated as dashed lines, where the first interface I1 has first direction D1 of connectivity, which is a "left" direction, and has a first input IN1 and a first output OUT1. The first input IN1 is associated with a first parameter P1 that is the parameter "steam" and the first output OUT1 is associated with a second output parameter P2 that is "condense return". The second interface I2 has a second direction of connectivity D2 which is "up" and a second input IN2 with a further input parameter that is a fluid to be heated. Finally the third interface I3 has a third direction of connectivity D3 that is "down" and a second output OUT2 with a further output parameter that is the same fluid after heating.

Internally in the process module PM1, the first input IN1 is connected to a pump P1, which is connected to a valve V2 that in turn is connected to an input or connection terminal of a heater H1 which has an output connection terminal connected to the output OUT1. Also the second input IN2 and second output OUT2 are connected to this heater H1. There is also an internal control IC for controlling the valve V2 based on the flow in the pipe interconnecting the pump P1 and valve V2.

Figure 8:
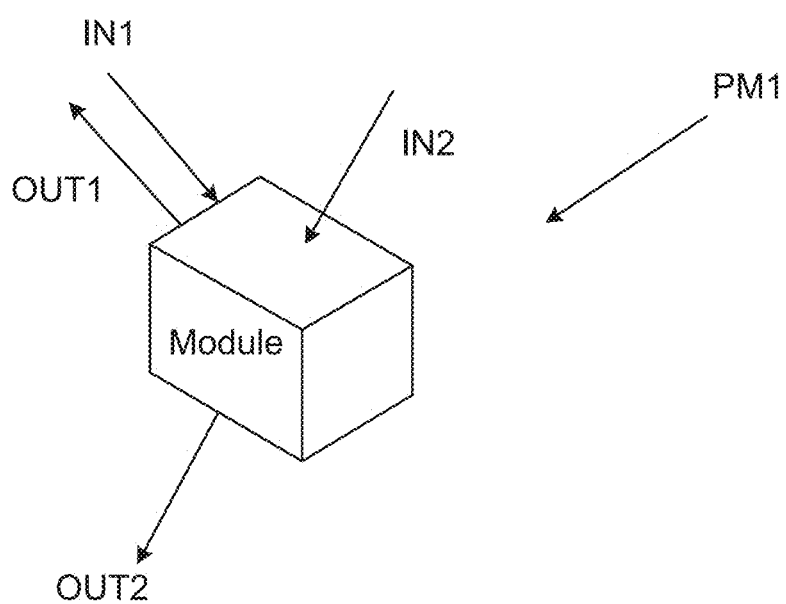
FIG. 8 shows a box representing the process module of FIG. 7, with sides corresponding to its interfaces, FIG. 9 show a flow chart of a number of method steps in a method of obtaining a model of a process control system and performing simulations therein.

FIG. 8 shows the same module as a box with a number of faces or sides, where an interface corresponds to a face of the box. It can thus be seen that a first "left" of the faces with input IN1 and output OUT1 provides the first interface I1, that a second "upper" face provides the second interface I2 with the second input IN2, while a third "down" face provides the third interface I3 with the second output OUT2.

The data of a description file may be used for obtaining a visual representation of the process control system, which is done through interconnecting the different process modules into a model of the process control system. Such a visual representation may be provided using the user interface 52.

The description files may also be used to obtain a system model for simulating the process control system 10.

Figure 9:
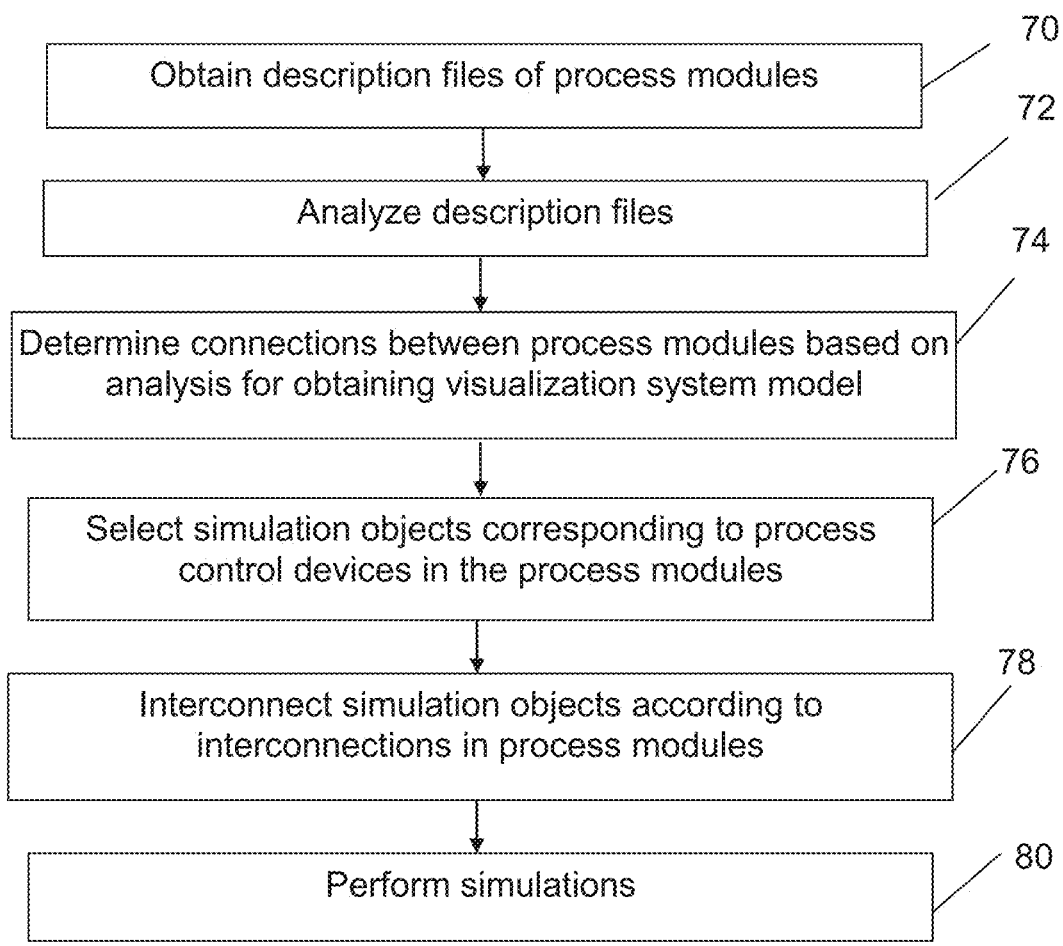
Figure 10:
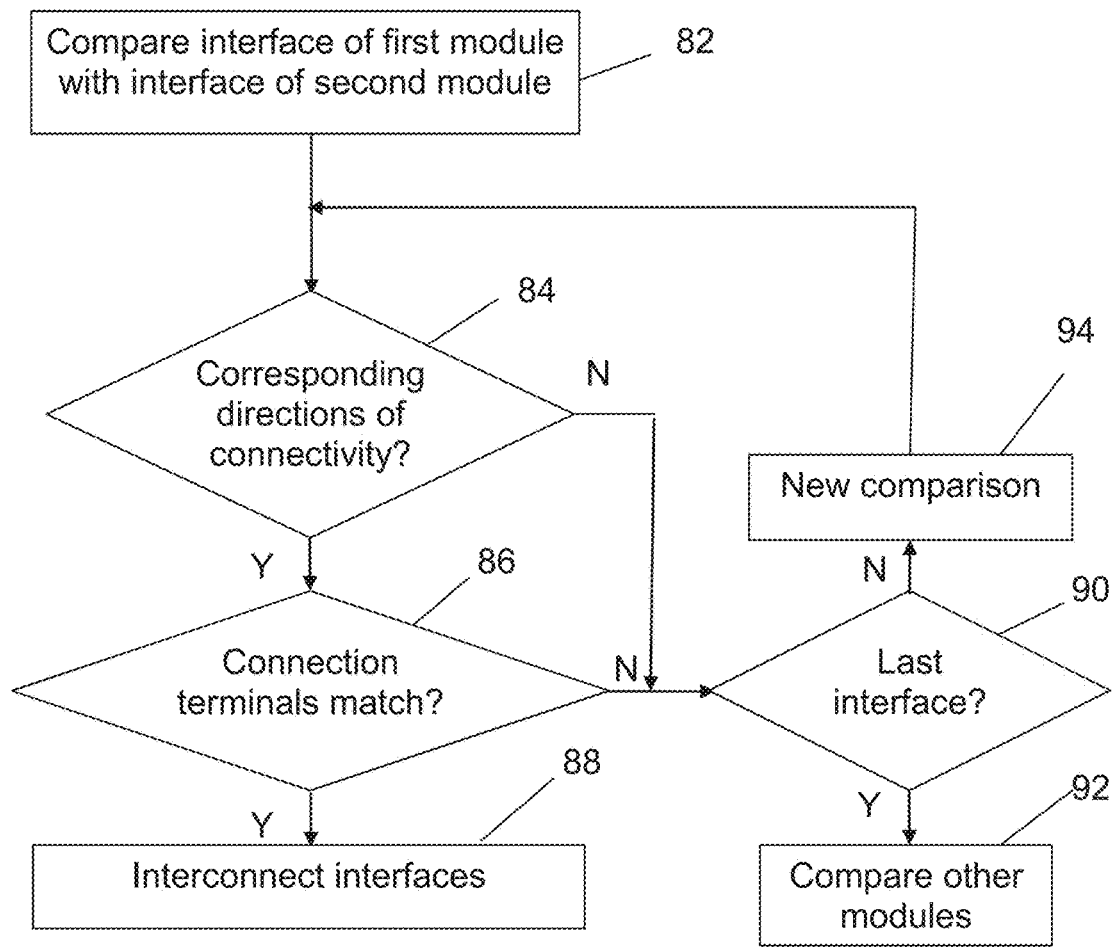
FIG. 10 shows a number of method steps for determining process modules that are to be interconnected, FIG. 11 schematically shows a number of process modules joined together to form a topological model of the process control system.

How this may be done will now be described in somewhat more detail with reference being made also to FIG. 9, which shows a flow chart of a number of method steps in a method of obtaining a model of the process control system and performing simulations therein. Reference is also made to FIG. 10, which shows a number of method steps for determining whether to interconnect process modules and how.

The method may start with the obtaining block 58 of the system model defining unit 54 in the device 44 obtaining the description files of the process modules that exist for the process control system 10 that is to be designed and simulated, step 70. These process modules may have been previously designed by a process engineer, and the description files describing them may be stored in a data base, such as the database 16. As an alternative the description files may be stored in a cloud server and obtained from the cloud server by the obtaining block 58, which may be easily achieved if the device 44 has internet connectivity.

Thereafter the description files are being analyzed, by the analyzing block 60, step 72.

The analyzing may be an analyzing with regard to the connection terminals and possibly also with regard to the type of elements used to interconnect process control devices with connection terminals. It may also be an analysis with regard to parameters associated with the connection terminals, such as any input parameters of the input terminals and output parameters of the output terminals. Alternatively, or additionally, such an analysis of parameters associated with connection terminals may be an analysis of an output parameter of a process control device being connected to an output of the process module as well as the analysis of an input parameter of a process control device being connected to the input of the process module, where such a process control device may be the process control device that is nearest to such a connection terminal.

In the case of the process control module of FIG. 6, it can be seen that the Tank T1 is closest to the output Out and the valve V1 is closest to the input In. Therefore an input parameter defined for the valve would be used when analyzing in respect of the input, while the output parameter defined for the tank T1 would be used when analyzing in respect of the output. For the process module example PM1 in FIG. 7 the pump P1 would be associated with the first input IN1 and the heater H1 with the first output OUT1. The model defining block 62 then determines connections between the process modules for defining a model of the process control system based on the analysis, step 74, which model may be a visualization model that visualizes the process control system.

The analysis and defining of the system model may more particularly be an analysis with regard to which process control modules are suitable to be interconnected with each other and then interconnecting them.

The investigation may more particularly be the following:

The investigation of if a first process module, such as the first process module PM1 in FIG. 7, is to be interconnected with a second process module may follow the following procedure. The analyzing block 60 may compare a first interface of the first module with a first interface of a second module, step 82, where the comparison may result in the finding of a match between the first interface of the first process module and the first interface of the second process module. The finding of a match may more particularly involve a finding of a match between the connection terminals of the two interfaces. The analyzing may therefore comprise determining a first connection terminal of the first process module that matches a corresponding first connection terminal of the second process module, where the determining that the first connection terminals match comprises determining that one of the connection terminals is an input terminal and the other is an output terminal. It may also be a finding of the same type of internal connection of the connection terminal. An input of the first process module having a connection of the type "Nozzle" may for instance only be compatible with an output of the second process module having the same type of connection. The first connection terminal of the first process module is in this case included in the first interface of the first process module and the first connection terminal of the second process module is included in the first interface of the second process module. The investigation may also involve investigating how many inputs and how many outputs the interfaces have, and possibly also the input parameters associated with the inputs and the output parameters associated with the outputs. In its simplest form the interface would only comprise one connection terminal; an input or an output. The investigation may also involve an investigation of the directions of connectivity of the interfaces.

With regard to comparing directions of connectivity, the analysis may be an analysis of if there is a correspondence in the direction of connectivity, where a correspondence may exist if the directions are opposite to each other. A "left" interface may thus correspond to a "right" interface and an "up" interface to "down" interface. A "left" interface may thus be connected to a "right" interface. A match may therefore be determined if the interfaces have opposite directions of connectivity. If there is such a correspondence between the two interfaces being compared, step 84, the analyzing block 60 may also make a determination based on the comparison between content of the interfaces.

As was mentioned above, the comparing may involve investigating if the connection terminals match or if there is correspondence. A match may exist if the number of connection terminals is the same, and each connection terminal in the first interface of the first process module matches a connection terminal in the first interface of the second process module. A match may therefore exist if the number of output terminals in one interface is the same as the number of input terminals of the other. It may also involve investigating the number of output terminals of the one interface and the number of input terminals of the other. It may also involve investigating the type of internal connection used by the connection terminal and/or the type of connection element used for connecting a process control device to the connection terminal. If both have the same type of connection, such as Nozzle, and/or uses the same type of connection element, such as a pipe, there may be correspondence. However if one connection type is a "Nozzle", while the other is not or is connected to a "pipe", while the other is not, the input and output are incompatible. Therefore, the above-described determining that the first connection terminal of the first process module matches the first connection terminal of the second process module may comprise determining that the terminals are connected to the same type of connection element and/or using the same type of internal connection.

The finding of a correspondence between input terminals and output terminals may be also comprise a determination of a correspondence between the parameters. The investigation may thus also comprise an investigation of if the input parameters and output parameters of a connection terminal in one interface and the connection terminal of the other interface are the same. The determining that the first connection terminal of the first process module matches the first connection terminal of the second process module would therefore in this case also comprise determining that the terminals are associated with the same process control parameter, which may be a control signal parameter or a physical quantity parameter, such as a material or an electrical power quantity.

The finding of a match between two interfaces may thus involve finding that the number of output terminals in one are the same as the number of input terminals in the other, that the same type of connection and/or the same type of connection elements are used as well as that the output parameters associated with these output terminals match the input parameters associated with the input terminals, which they do if the parameters are the same.

Thus, if the directions of connectivity are opposite to each other and the connection terminals of the interfaces match, step 86, then a determination that the interfaces are connected to each other is made by the model defining block 62, step 88. This determination may involve determining connections between the matched communication terminals of the process modules. The determining of connections may especially comprise determining a connection between the first connection terminal of the first process module and the first connection terminal of the second process module. However, in case the directions of connectivity were not corresponding, step 84, or the connection terminals did not match, step 86, then the analyzing block 60 checks if all interfaces of both the process modules have been investigated. In case they have not been, i.e., there are remaining interfaces that have not been investigated, then the recently investigated interfaces were not the last investigated interfaces of the two process modules, step 90, and a new comparison is made between interfaces of the two process modules regarding directions of connectivity and matching of connection terminals, step 94. However, in case all interfaces of the two module have been investigated, step 90, then another module comparison involving at least one other process module is made, step 92.

In this way the process modules are investigated until connections between process modules forming a visualization model of the process control system has been identified. The model is thus a visualization model, i.e., a model that visualizes the process control system. This model, which in the following is termed a topological model, does not have to be displayed However, through the analyzing of the description files it is possible to obtain knowledge about the process control system, which can be used for simplifying simulation.

The determination of interconnections between the process modules may also be described in the following way.

A process module, which may be the first process module PM1 in FIG. 7, which is to be combined with at least one other process module for the design of the process control system, may be selected.

The second output OUT2 is provided for hot liquid, the first output OUT1 is provided for a condensate return, the first input IN1, which may need to be connected to a delivery device, is provided for steam, and the second input IN2 is provided for a liquid to be heated.

Descriptive data in the description file for the process module PM1, which provides information about connection possibilities for the process module PM1 for connection to at least one additional process module of the process control system, is then collected. An individual topology of the process module PM1 may also be generated by means of the descriptive data, providing information about possibilities for spatially arranging the process module PA1 with respect to other process modules, i.e., for interconnection of the interfaces of the first process module PM1 with interfaces of other process modules, which spatially arranging is made for visualizing purposes.

A description file for a process module provides a formal description of the process module, such as information about the internal process structure. There may in particular be information about process parameters, for instance in the form of physical quantities, such as mass and energy flows through the process module and information flows, such as control signal flows as evidenced by control parameters. As an alternative such flows may be determined from the specified types of connections and/or connection elements. The internal process structure or the system structure can be supplied in a standard format, for example, in IEC 62424 (CAEX) or ISO 15926 (XMplant). This should include the interconnection system of a process module, for instance in the form of pipes or electrical conductors or control signal lines, possible connections of a process module to other process modules and the process control devices.

The description file can be read out of a data memory or a database via an internal network or an external network.

The interior of a process module PM1 may thus be described in a description file and the description file may have definitions according to the principles that can be found in FIGS. 4 and 5. In addition the system structure, which is shown in FIG. 7, may be oriented in the way shown in FIG. 8.

In the view in FIGS. 7 and 8, a steam inlet via the input IN1 and a condensation return via the output OUT1 are shown on the left side of a process module PM1. A liquid is input from above via input IN2 in the direction of the arrow, and liquid is output via the output OUT2 in the direction of the arrow at the base of the process module PM1. To this extent, the arrows, which show parameter flows in and out of the process also indicate the spatial alignment of the interfaces I1, I2, I3 with the inputs and outputs IN1, OUT1, IN2, OUT2.

There may be a virtual spatial arrangement and connection of the process module PM1 to at least one other process module to describe and/or represent the spatial structure of the process control system for visualization purposes.

The process modules may be assembled during the planning of the process control system. To carry this out, the process modules, which are represented by their individual topologies, may be assembled like building blocks. In this way, the interfaces of the process modules are connected to one another during the planning. This step can be carried out in any way during the planning of the system.

Figure 11:
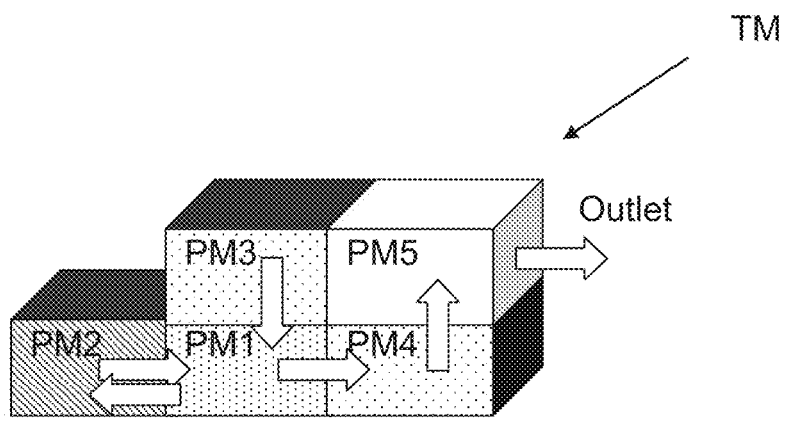

The result of such an arrangement of process modules according to the building block type is illustrated in FIG. 11. As can be seen in the figure, the first process module PM1 is connected to a second, third and fourth process module PM2, PM3, PM4, where the fourth is in turn connected to a fifth process module PM5, from which a product outlet is arranged.

The operation can be carried out as an automated process, wherein the selection of the process module PM1, the detection of its description file and determination of connections to other process modules and possibly also the virtual spatial arrangement and actual connection to other process modules takes place automatically, namely without any interaction with a user.

FIG. 11 shows a modular design system after creating a topological model TM of the process control system using the process modules PM1, PM2, PM3, PM4 and PM5. Based on a given design of the system and the descriptive data of the process modules in the description files, an incremental approximation method can be carried out to assemble the topological model of the system and to ultimately represent it as a single model for instance on a display.

With a given construction of the system, the topological connections between the process modules are thus known. Based on these connections, a dependency model can be created in a graphical representation, for example, wherein each process module is represented as a node, and each connection between the nodes is represented as an edge. Alternatively, connecting matrices could also be generated between the process modules.

Figure 12:
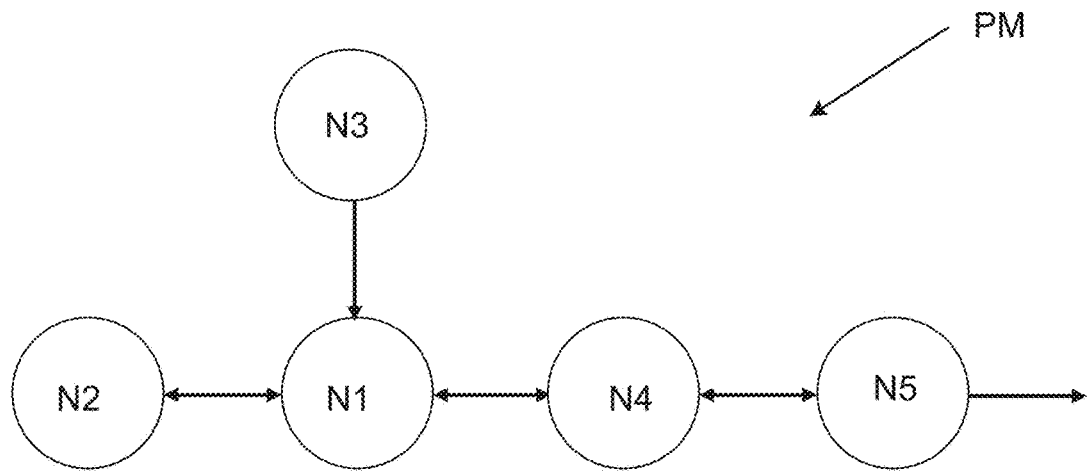
FIG. 12 shows a dependency model used for forming a simulation model of the process control system.

FIG. 12 shows a graphical plot of a dependency model DM, which is generated automatically. As can be seen in the figure a number of nodes N1, N2, N3, N4 and N5 corresponding to the process modules PM1, PM2, PM3, PM4 and PM5 have been created. Thereby automatic generation is based on the design and/or the topological model of the system, which is shown in FIG. 11.

The topological model TM of the process control system may be generated by arranging mutually dependent process modules spatially, so that they can cooperate with one another and/or with other process modules.

On the basis of the graphical plot, the connections between the topological parts of each process module can be created. The individual topology of each type of module of each module instance used is read within the modular design system and the aforementioned nodes can be replaced by the specific topological parts, in particular simulation objects which represent the process control devices used.

The topological model TM of the entire modular system is derived from individual models of the process modules and their connections, based on the design of the system. Based on this topological model of the entire modular design system, different transformations can be carried out to derive additional models, which can be used for planning and operation.

It is above all possible to form a simulation model using knowledge of the interconnections of the process modules. The functions carried out by a process module may also be simulated by using its descriptive data found in the associated description file. In this simulation objects of the process control devices are used, i.e., computer objects used for simulating the functionalities of the process control devices. The system construction block 64 of the simulating unit 56 more particularly forms this system model that is to be used for simulating the process control system 10. The forming of the model may for instance comprise the system construction block 64 selecting simulation objects corresponding to the process control devices in the interconnected process modules, step 76, i.e., in the process control devices of the process modules for which connections have been determined. The selection may comprise fetching the simulation objects from the data base 16 or from the cloud. The system construction block 64 then interconnects the simulation objects representing process control devices according to the interconnections that are defined in the interior of the process modules and the interface connections determined by the module defining block 62, step 78. The simulation objects are thus interconnected according to the data specifying how the process control devices are interconnected between the inputs and outputs of the process modules as well as according to the connections determined between the process modules. After the process control devices have been interconnected in this way for forming the simulation model of the process control system, it is then possible to perform simulations in the simulation model by the simulation block 66, step 88.

In order to form the simulation model, the simulation objects that are to be used may be obtained through searching for the devices being used, i.e., a valve or a pump, for example.

There are thus finished simulation objects for a valve, a pump or the like, for example, allowing a material flow when the valve is open but not when the valve is closed. These simulation objects are provided without relationships. They thus have to be interconnected in order to form the simulation model. This may be done through replacing the process control devices in a process module with a simulation object. A valve may thus be replaced by its simulation object, namely by a simulated valve.

Based on the topological model TM of the system or rather through the interconnections defined between process modules and their definitions in the description files, a simulation can thus be generated automatically.

Simulation objects can be generated either for a simulation system developed in-house or a simulation language and a corresponding tool of the prior art may be used.

Such a tool does not automatically generate the simulation objects. The simulation objects are generated automatically by another program in a corresponding modeling language, namely a programming language for the simulation.

The tools then translate the simulation objects into a computer-interpretable code and supply the required mathematics for solving an overall simulation model.

To generate a simulation, first a suitable simulation object may be instantiated for each device used in the system.

Figure 13:
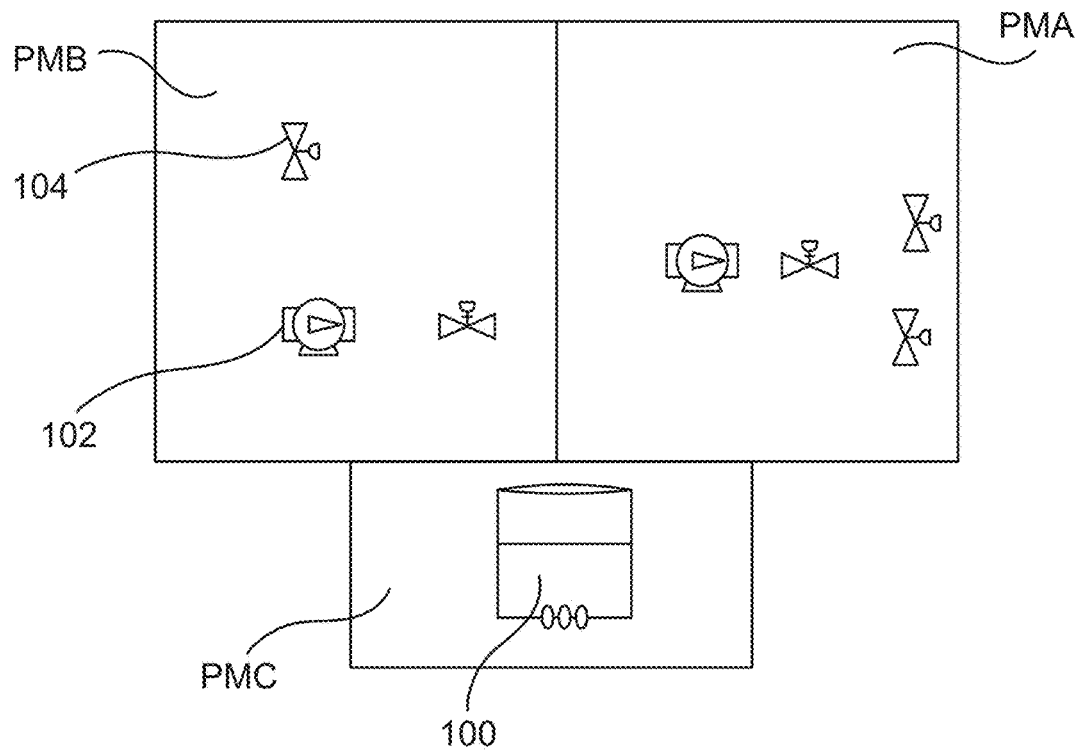
FIG. 13 shows a number of interconnected process modules into which a number of simulation objects have been added.

FIG. 13 shows the simulation object instances in a number of interconnected modules PMA, PMB and PMC in FIG. 13. A tank as a simulation object 100, a pump as a simulation object 102 and a valve as a simulation object 104 can be generated automatically, for example, in the "Modelica" language.

Figure 14:
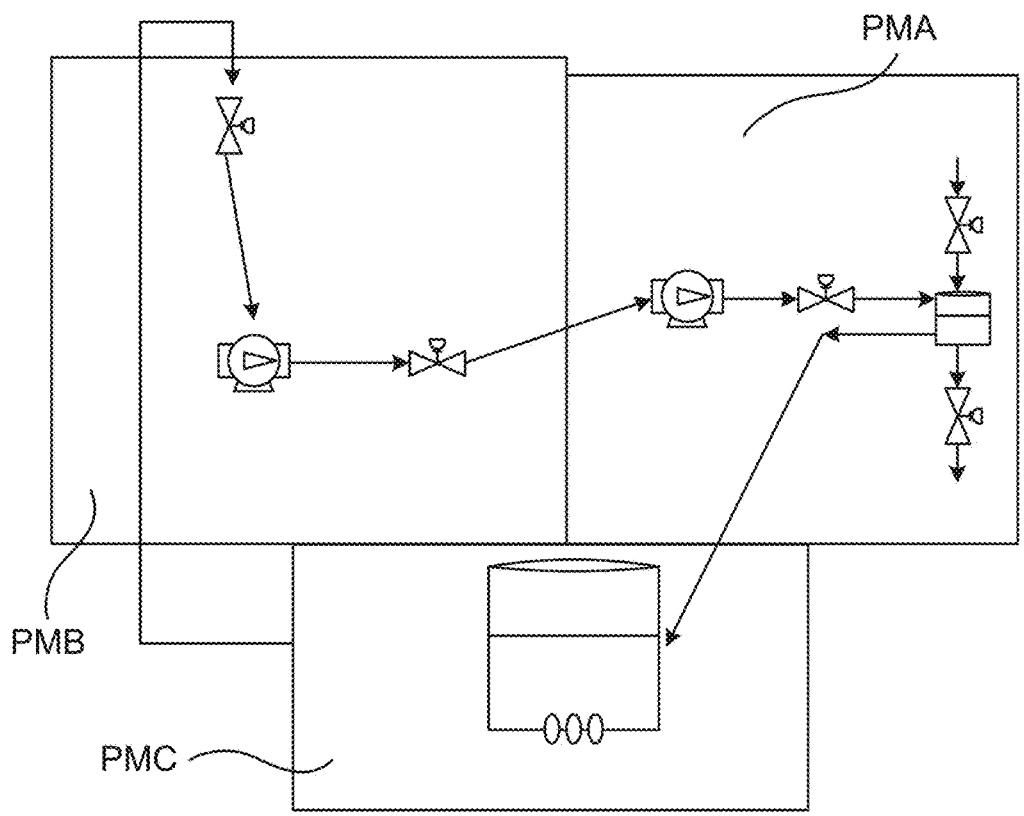
FIG. 14 shows how the individual simulation objects in the process modules are being interconnected.

In a last step, the simulation objects 100, 102, 104 of the process modules PMA, PMB and PMC are interconnected, based on the data in the description files and the determined connections between the process modules. This is illustrated in FIG. 14.

A simulation object 100, 102, 104, which is generated based on the topological model TM of the system and the individual topology of a process module, may therefore be generated completely automatically without any support by a user.

To this extent, a simulation model is also created automatically for the entire system.

A simulation object 100, 102, 104 describes the system and therefore forms a system simulation but not a process simulation. The process characteristics cannot be derived from given technical planning data. A simulation object 100, 102, 104 can therefore be used with IAT and FAT in the planning for test purposes.

Based on the topological model TM and/or the simulation objects 100, 102, 104, it is also possible to recommend to a system designer or engineer such types of modules, which can be used additionally in the system to complement it.

The device 44 may therefore also be configured to propose a process module to change, supplement and/or complete the topology of the process control system.

For example, if a process module is used but not all of its process connection terminals are connected, this is detected and the suggestion is made to use another process module and to connect it to the existing and/or recognized module(s).

Figure 15:
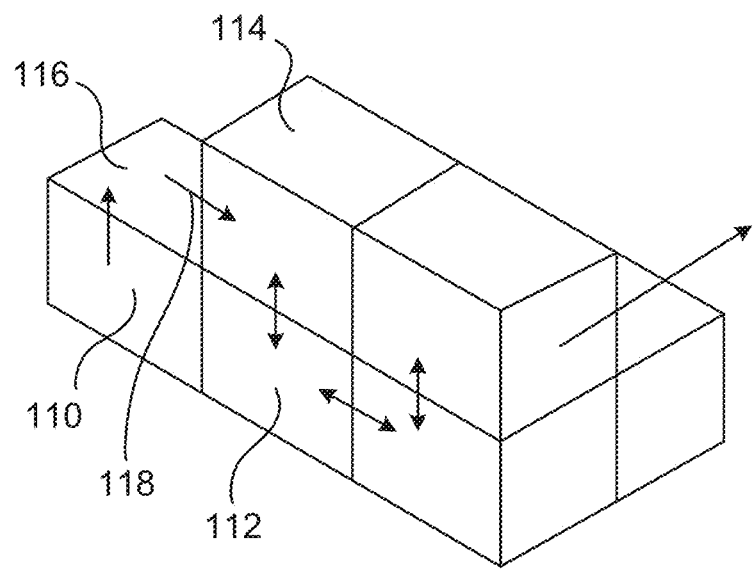
FIG. 15 shows a schematic diagram of the topological model with two process modules having input and output interfaces lacking connections.

FIG. 15 shows an example of a modular design system during planning. There are two process modules 110, 114, which are not completely connected to their surroundings.

A first process module 110 has an open interface 116 for output. A second process module 114 has an open interface 118 for input. This is detected and there is a search for a type of module capable of connecting to these open interfaces 116, 118.

Figure 16:
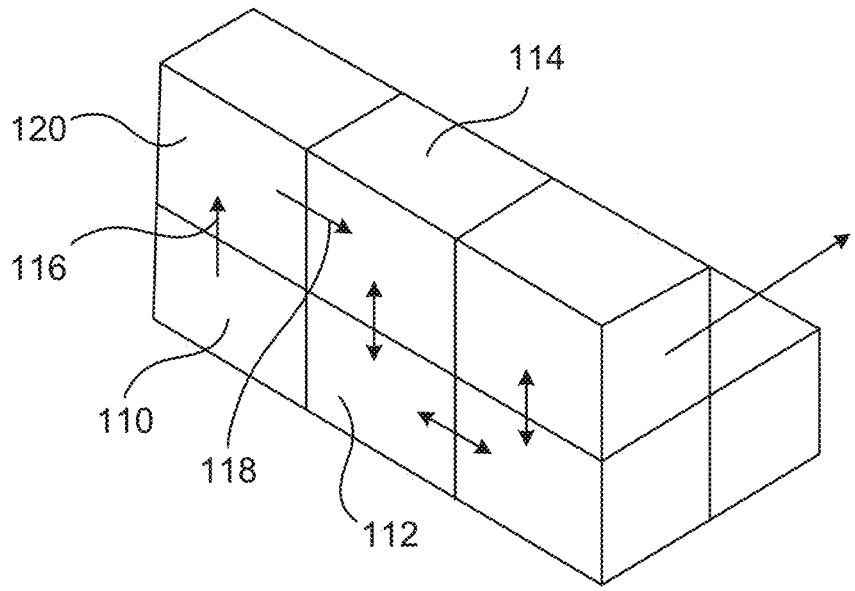
FIG. 16 shows a schematic diagram of the topological model according to FIG. 15, wherein the input interfaces and output interfaces of the two process modules are connected to a recommended further process module.

A type of module which fits geographically or spatially into the open place between the two process modules 110, 114 and can thereby connect to the open interfaces 116, 118 is proposed. FIG. 16 shows this schematically. The process module 120 has been recommended.

Since the process modules are described formally, process properties can also be used to recommend some types of modules for planning. Since the functionality of a type of module is known, the process properties or system properties are also known.

Some types of modules can also be recommended during maintenance or service. When one type of module has defects and/or can no longer be used, it must be replaced. Based on the individual topology, there can be a search for a similar process module, which is physically suitable but is also suitable with respect to its instrument-specific equipment. A list of possible replacement modules can be generated.

Figure 17:
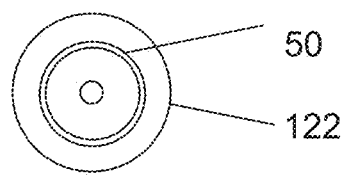
FIG. 17 shows a computer program product comprising a data carrier with computer program code, in the form of a CD-ROM disc, for implementing the functionality of the system model creating and simulation device.

The system model creating and simulation device may, as was previously mentioned, be provided in the form of one or more processors together with computer program memory including computer program code for performing its functions. This computer program code may also be provided on one or more data carriers which perform the functionality of the problem investigating device when the program code is being loaded into a computer forming the problem investigating device. One such data carrier 122 with the previously mentioned computer program code 50, in the form of a CD ROM disc, is schematically shown in FIG. 17. Such a computer program may as an alternative be provided on a server and downloaded therefrom into a computer in order to obtain the system model creating and simulation device.

The invention has a number of advantages. It enables the provision of a simulation system using description files for process modules. Thereby, this data, which has been designed for the purpose of visualization, may be used for simplifying the obtaining of a simulation model. In this way simulations may be obtained more efficiently and faster with a limited additional effort.

While the invention has been described in connection with what is presently considered to be most practical and preferred, it is to be realized that the invention is not to be limited to the disclosed embodiments, but on the contrary, is intended to cover various modifications and equivalent arrangements. The invention is only to be limited by the following claims.

The invention claimed is:

1. A method for obtaining a model of a process control system and performing simulations therein, the method comprising:
    obtaining description files of process modules used for visualizing a part of the process control system, each process module having one or more inputs, one or more outputs and one or more process control devices connected between said one or more inputs and said one or more outputs, wherein each description file specifies, for the corresponding process module, connection terminals in the form of inputs and outputs, the process control devices and data specifying how the process control devices are connected between said inputs and outputs,
    analyzing the description files with regard to connection terminals, said analyzing comprising determining a first connection terminal of a first process module that matches a corresponding first connection terminal of a second process module, wherein the determining that the first connection terminals match comprises determining that one of the first connection terminals is an input terminal and the other is an output terminal,
    determining connections between the process modules based on the analysis, said determining of the connections comprises determining a connection between the first process module and the second process module and comprises determining a connection between the first connection terminal of the first process module and the first connection terminal of the second process module,
    selecting simulation objects corresponding to the process control devices of the process modules for which the connections have been determined,
    interconnecting the simulation objects according to said data specifying how the process control devices are connected between the inputs and outputs of the process modules as well as through the connections determined between the process modules for forming a simulation model of the process control system, and
    performing simulations in the simulation model,
    wherein each process module includes a number of interfaces each having a plurality of connection terminals, where the first connection terminal of the first process module is included in a first interface of the first process module and the first connection terminal of the second process module is included in a first interface of the second process module,
    wherein the analysis comprises determining that a first interface of the first process module matches a first interface of the second process module, which determining of a match comprises determining that the number of connection terminals are the same, and each connection terminal in the first interface of the first process module matches a connection terminal in the first interface of the second process module, and
    wherein the determining of a connection between the first process module and the second process module comprises determining a connection between the first interface of the first process module and the first interface of the second process module.

2. The method according to claim 1, wherein the process control system is a chemical process control system.

3. The method according to claim 2, wherein a connection terminal has a type of connection to the interior of the process module, the corresponding description files comprises data specifying the type of connection of the connection terminal to the interior of the process module and the determining that the first connection terminal of the first process module matches the first connection terminal of the second process module comprises determining that the terminals have the same type of connection to the interior of the respective process module.

4. The method according to claim 2, wherein a process control device of a process module is connected to a connection terminal via a connection element, the corresponding description files comprises data specifying type of connection element between the process control device and the connection terminal and the determining that the first connection terminal of the first process module matches the first connection terminal of the second process module comprises determining that the terminals are connected to the same type of connection element.

5. The method according to claim 2, wherein the description files comprise process control parameters associated with the connection terminals and the determining that the first connection terminal of the first process module matches the first connection terminal of the second process module comprises determining that the terminals are associated with the same process control parameter.

6. The method according to claim 2, further comprising creating a topological model (TM) of the process control system using the process modules and the connections that have been determined between the process modules and proposing after the creating of the topological model to change, supplement and/or complete the topology of the process control system.

7. The method according to claim 1, wherein a connection terminal has a type of connection to the interior of the process module, the corresponding description files comprises data specifying the type of connection of the connection terminal to the interior of the process module and the determining that the first connection terminal of the first process module matches the first connection terminal of the second process module comprises determining that the terminals have the same type of connection to the interior of the respective process module.

8. The method according to claim 1, wherein a process control device of a process module is connected to a connection terminal via a connection element, the corresponding description files comprises data specifying type of connection element between the process control device and the connection terminal and the determining that the first connection terminal of the first process module matches the first connection terminal of the second process module comprises determining that the terminals are connected to the same type of connection element.

9. The method according to claim 8, wherein the connection element is of a type carrying control signals.

10. The method according to claim 8, wherein the connection element is of a type carrying the same physical quantity.

11. The method according to claim 1, wherein the description files comprise process control parameters associated with the connection terminals and the determining that the first connection terminal of the first process module matches the first connection terminal of the second process module comprises determining that the terminals are associated with the same process control parameter.

12. The method according to claim 11, wherein the same process control parameter is a control signal parameter.

13. The method according to claim 11, wherein the same process control parameter is a physical quantity parameter.

14. The method according to claim 10, wherein each interface has a direction of connectivity and the determining that a first interface of the first process module matches a first interface of the second process module comprises determining that the first interface of the first process module and the first interface of the second process module have opposite directions of connectivity and the determining of a connection between interfaces is made for interfaces having a direction of connectivity that are opposite to each other.

15. The method according to claim 1, further comprising creating a topological model (TM) of the process control system using the process modules and the connections that have been determined between the process module and proposing after the creating of the topological model to change, supplement and/or complete the topology of the process control system.

16. The method according to claim 1, wherein at least one of the process modules includes interfaces in six different directions.

17. A system model creating and simulation device for a process control system, the device comprising being configured to:
  obtain description files of process modules used for visualizing a part of the process control system, each process module including one or more inputs, one or more outputs and one or more process control devices connected between said one or more inputs and said one or more outputs, wherein each description file specifies, for the corresponding module, connection terminals in the form of inputs and outputs, the process control devices and data specifying how the process control devices are connected between said inputs and outputs,
  analyze the description files with regard to connection terminals, said analyzing comprising determining a first connection terminal of a first process module that matches a corresponding first connection terminal of a second process module, wherein the determining that the first connection terminal matches the second connection terminal comprises determining that one of the first connection terminals is an input terminal and the other is an output terminal,
  determine connections between the process modules based on the analysis, said determining of the connections comprising determining a connection between the first process module and the second process module and comprising determining a connection between the first connection terminal of the first process module and the first connection terminal of the second process module,
  select simulation objects corresponding to the process control devices of the process modules for which the connections have been determined,
  interconnect the simulation objects according to said data specifying how the process control devices are connected between the inputs and outputs of the process modules as well as through the connections determined between the process modules for forming a simulation model of the process control system, and perform simulations in the simulation model of the process control system, wherein each process module includes a number of interfaces each having a plurality of connection terminals, where the first connection terminal of the first process module is included in a first interface of the first process module and the first connection terminal of the second process module is included in a first interface of the second process module, wherein the analysis comprises determining that a first interface of the first process module matches a first interface of the second process module, which determining of a match comprises determining that the number of connection terminals are the same, and each connection terminal in the first interface of the first process module matches a connection terminal in the first interface of the second process module, and wherein the determining of a connection between the first process module and the second process module comprises determining a connection between the first interface of the first process module and the first interface of the second process module.

18. The system model creating and simulation device according to claim 17, wherein a connection terminal has a type of connection to the interior of the process module, the corresponding description files includes data specifying the type of connection of the connection terminal to the interior of the process module and the system model creating and simulation device when being configured to determine that the first connection terminal of the first process module matches the first connection terminal of the second process module is further configured to determine that the terminals have the same type of connection to the interior of the respective process module.

19. The system model creating and simulation device according to claim 17, wherein at least one of the process modules includes interfaces in six different directions.

20. A computer program product for obtaining a model of a process control system and performing simulations therein, said computer program product comprising a data carrier with computer program code configured to cause a system model creating and simulation device to, when said computer program code is loaded into said system model creating and simulation device:

obtain description files of process modules used for visualizing a part of the process control system, each process module including one or more inputs, one or more outputs and one or more process control devices connected between said one or more inputs and said one or more outputs, wherein each description file specifies, for the corresponding process module, connection terminals in the form of inputs and outputs, the process control devices and data specifying how the process control devices are connected between said inputs and outputs, analyze the description files with regard to connection terminals, said analyzing comprising determining a first connection terminal of a first process module that matches a corresponding first connection terminal of a second process module, wherein the determining that the first connection terminal matches the second connection terminal comprises determining that one of the first connection terminals is an input terminal and the other is an output terminal, determine connections between the process modules based on the analysis, said determining of the connections comprising determining a connection between the first process module and the second process module and comprising determining a connection between the first connection terminal of the first process module and the first connection terminal of the second process module, select simulation objects corresponding to the process control devices of the process modules for which the connections have been determined, interconnect the simulation objects according to said data specifying how the process control devices are connected between the inputs and outputs of the process modules as well as through the connections determined between the process modules for forming a simulation model of the process control system, and perform simulations in the simulation model of the process control system, wherein each process module includes a number of interfaces each having a plurality of connection terminals, wherein the first connection terminal of the first process module is included in a first interface of the first process module and the first connection terminal of the second process module is included in a first interface of the second process module, wherein the analysis comprises determining that a first interface of the first process module matches a first interface of the second process module, which determining of a match comprises determining that the number of connection terminals are the same, and each connection terminal in the first interface of the first process module matches a connection terminal in the first interface of the second process module, and wherein the determining of a connection between the first process module and the second process module comprises determining a connection between the first interface of the first process module and the first interface of the second process module.

* * * * *